(12) United States Patent
Tsuboi

(10) Patent No.: US 7,046,168 B2
(45) Date of Patent: May 16, 2006

(54) INTER-VEHICLE COMMUNICATION METHOD AND DEVICE

(75) Inventor: Shoichi Tsuboi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 189 days.

(21) Appl. No.: 10/863,622

(22) Filed: Jun. 8, 2004

(65) Prior Publication Data

US 2005/0030202 A1 Feb. 10, 2005

(30) Foreign Application Priority Data

Jun. 19, 2003 (JP) ............................. 2003-174644

(51) Int. Cl.
*G08G 1/16* (2006.01)

(52) U.S. Cl. ................... 340/903; 340/901; 340/902; 340/995.1; 340/995.11; 340/995.12; 340/425.5; 455/11.1; 455/15; 455/22; 455/23; 455/24; 455/88; 455/90.2; 701/117; 701/118

(58) Field of Classification Search ............... 340/901, 340/902, 903, 995.12, 995.1, 995.11, 425.5; 455/11.1, 15, 22, 23, 24, 88, 90.2; 701/117, 701/118
See application file for complete search history.

(56) References Cited

U.S. PATENT DOCUMENTS

| 4,823,373 | A | | 4/1989 | Takahashi et al. |
| 6,150,961 | A | * | 11/2000 | Alewine et al. .......... 340/995.1 |
| 6,249,232 | B1 | * | 6/2001 | Tamura et al. .............. 340/902 |
| 6,765,495 | B1 | * | 7/2004 | Dunning et al. ............ 340/903 |
| 2002/0198660 | A1 | * | 12/2002 | Lutter et al. ................ 701/301 |
| 2005/0129410 | A1 | * | 6/2005 | Wilsey et al. ............... 398/153 |

* cited by examiner

*Primary Examiner*—Thomas J. Mullen, Jr.
*Assistant Examiner*—Edny Labbees
(74) *Attorney, Agent, or Firm*—Brinks Hofer Gilson & Lione

(57) ABSTRACT

An inter-vehicle communication method according to the present invention performs communication by sequentially relaying transmission information among vehicles. For broadcasting the transmission information to peripheral vehicles, a vehicle transmitting the transmission information designates relay vehicles and causes the relay vehicles to broadcast reception information to peripheral vehicles of the relay vehicles. In order to designate the relay vehicles, the vehicle transmitting the transmission information receives positional information from its peripheral vehicles, identifies branch roads on which the respective peripheral vehicles exist by referring to map information, and designates as relay vehicles peripheral vehicles farthest away from the vehicle transmitting the transmission information on the respective branch roads.

20 Claims, 9 Drawing Sheets

FIG. 5A

| VEHICLE ID | LOCATION (LONGITUDE AND LATITUDE) | VEHICLE EXISTENCE ROAD | RELAY FLAG |
|---|---|---|---|
| | | | |
| | | | |
| | | | |

FIG. 5B

| TRANSMISSION VEHICLE ID |
|---|
| MESSAGE NUMBER |
| NUMBER OF RELAYS (=H) |
| RELAY VEHICLE ID ··· |
| INFORMATION (RECEPTION MESSAGE) |

FIG. 5C

| VEHICLE ID ··· |
|---|
| CURRENT LOCATION |

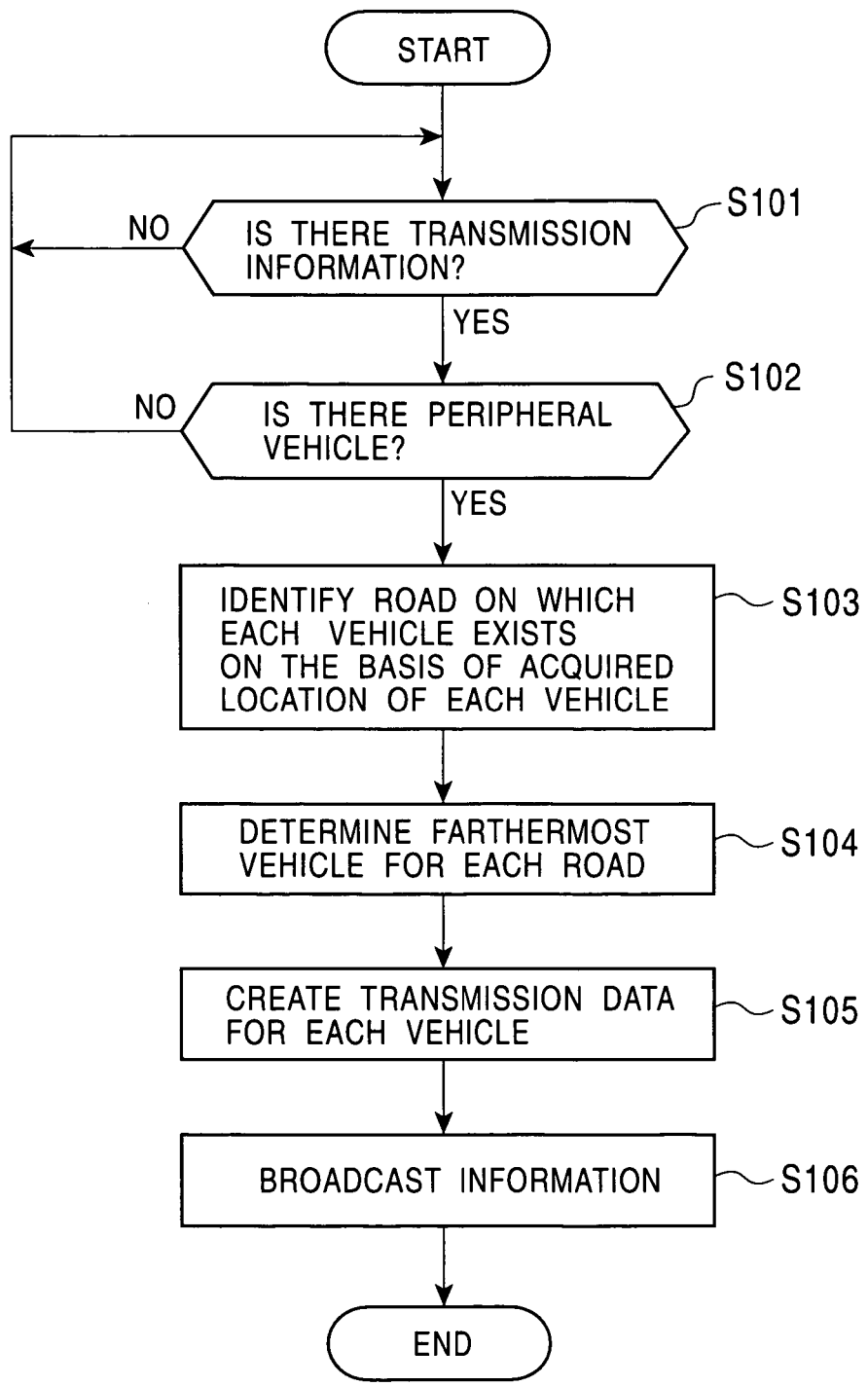

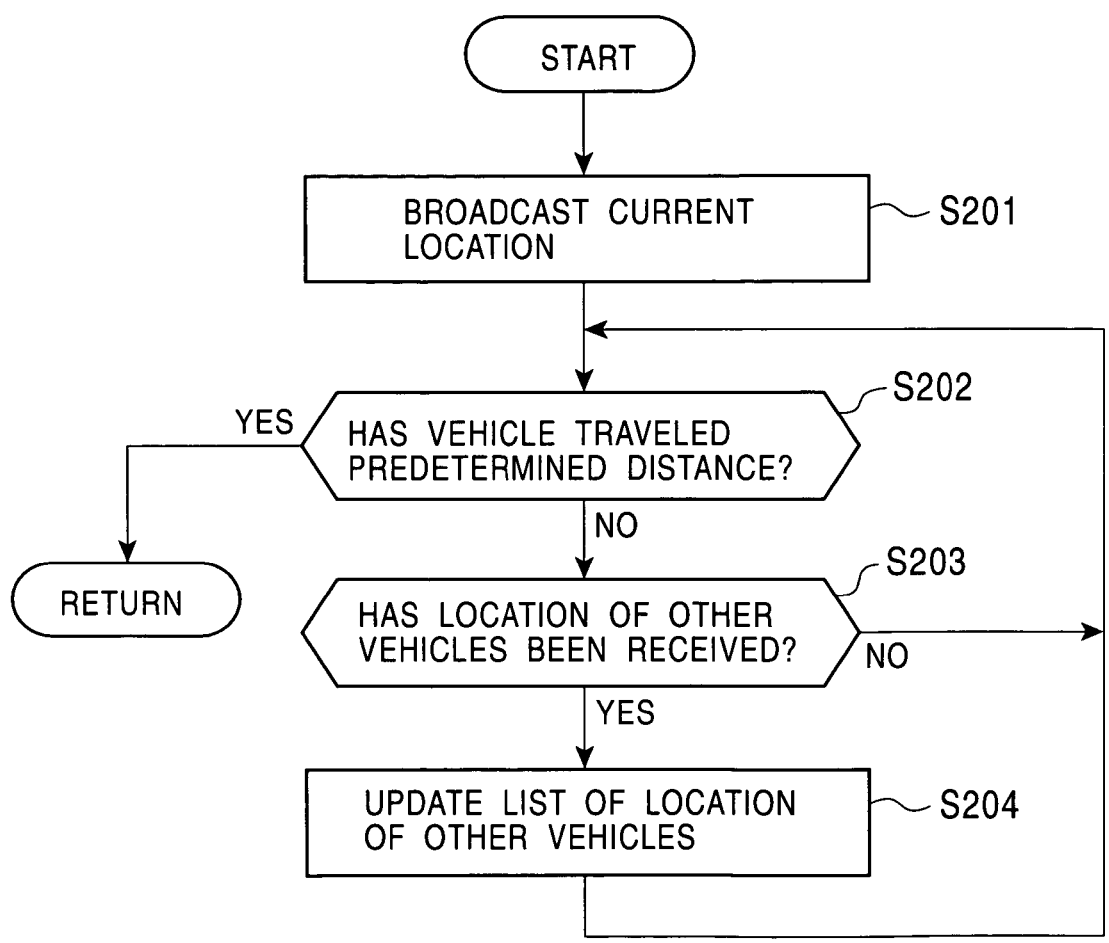

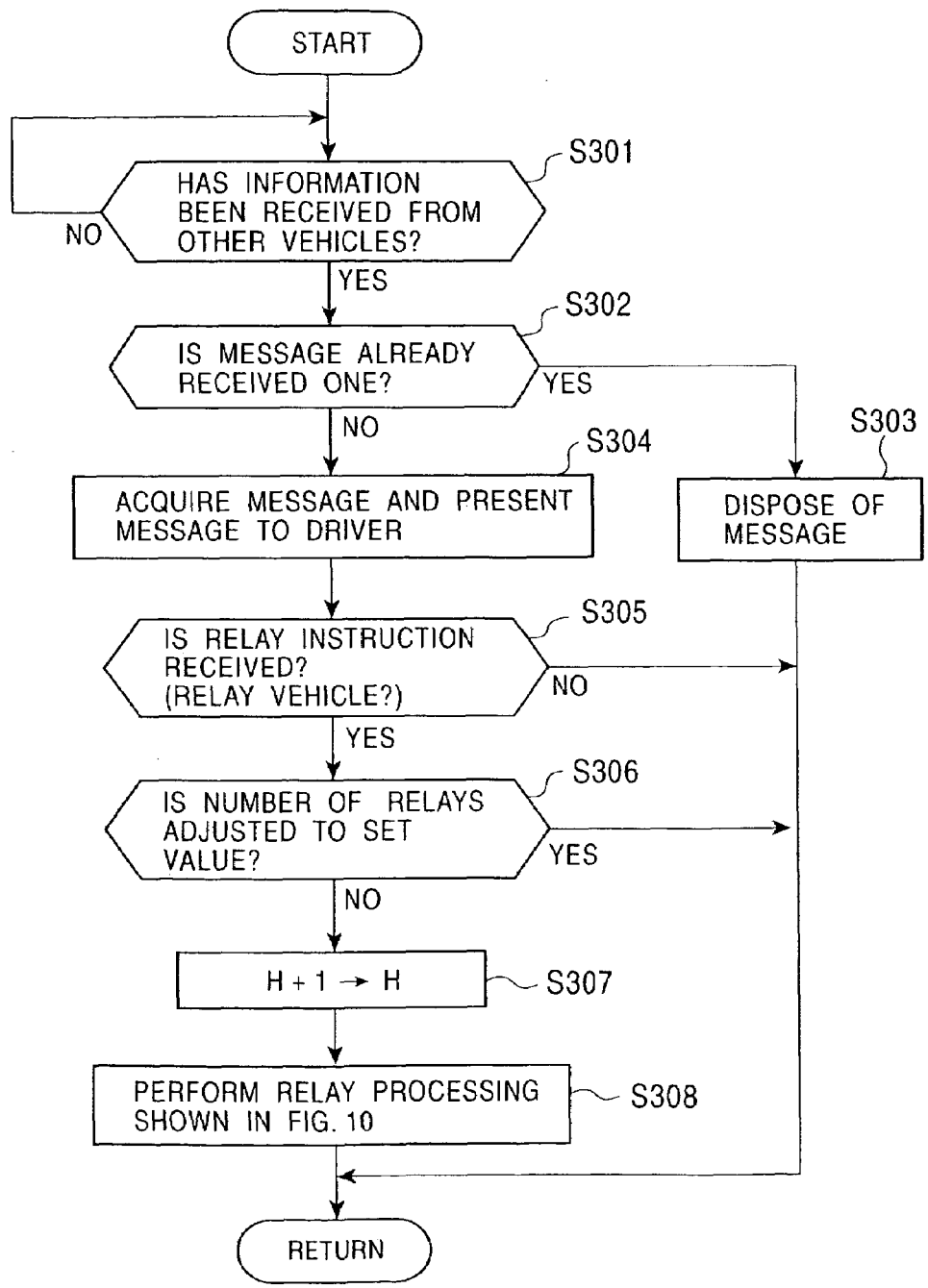

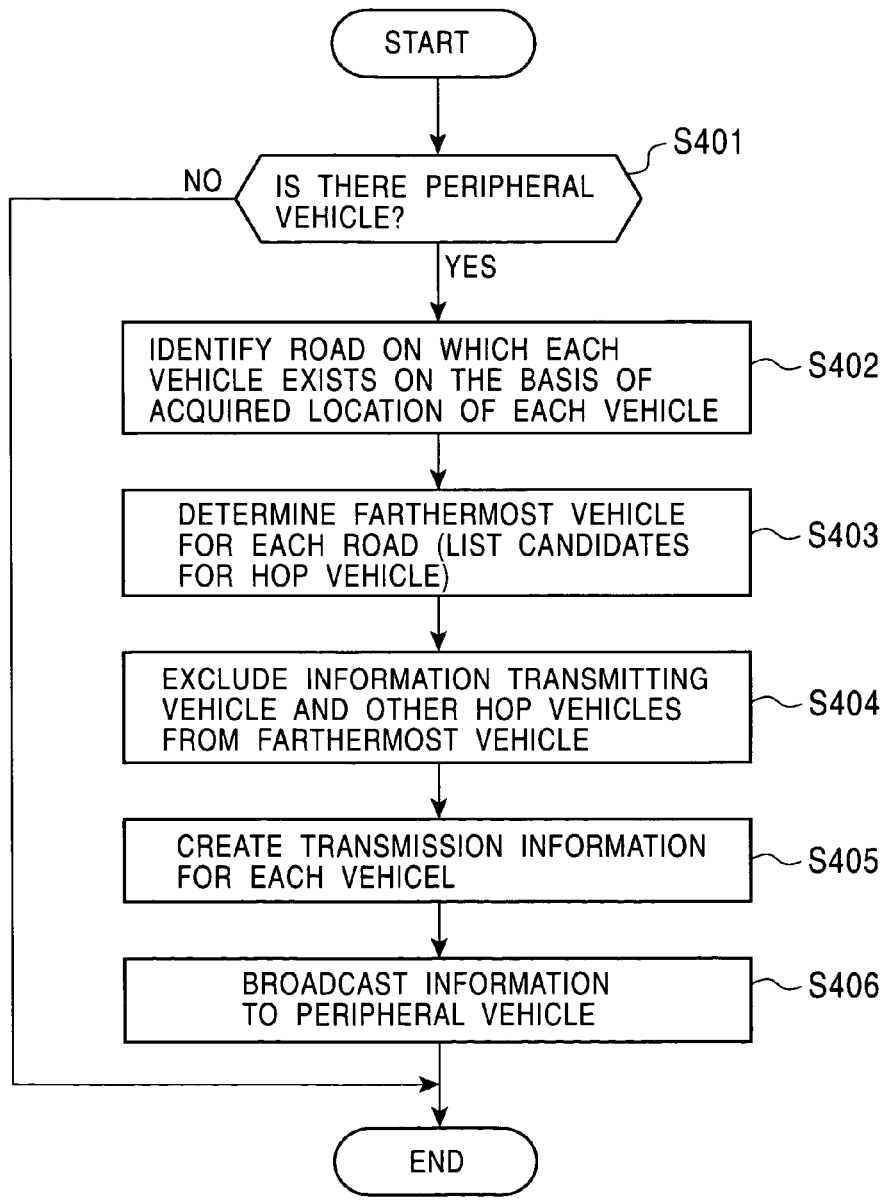

INTER-VEHICLE COMMUNICATION METHOD AND DEVICE

BACKGROUND OF THE INVENTION

1. Field of the Invention

The present invention relates to inter-vehicle communication methods and inter-vehicle communication devices, and more particularly, to an inter-vehicle communication method and an inter-vehicle communication device for performing communication by sequentially relaying transmission information among vehicles.

2. Description of the Related Art

Developments in communication technologies enable communication among moving objects, such as among vehicles, (referred to as inter-vehicle communication). For such inter-vehicle communication, a method for transmitting accident information to vehicles behind, one-by-one along the road when an accident occurs has been suggested. In such a method, however, only one-to-one communication is performed even if a plurality of vehicles exists in an area where data is relayed. Thus, the communication load increases, and hardly any other information can be transmitted.

Another method (first known art) has been suggested in which a transmission vehicle transmits (or broadcasts) information without specifying reception vehicles, the reception vehicles receive the information and appropriately display the information, and at the same time, broadcast the reception information to other vehicles, and such broadcasting (multi-hop) is sequentially repeated. According to the first known art, the communication area can be increased even for inter-vehicle communication with a limited communication distance.

Also, as a second known art, a method for preventing an increase in the bandwidth used for information transmission by deleting unnecessary data even if the number of relays (the number of hops) increases, in other words, even if the number of relaying communication devices increases, is disclosed in Japanese Unexamined Patent Application Publication No. 2002-135201.

In broadcast-type inter-vehicle communication according to the first known art, due to the relaying performed by all the vehicles for multi-hop, the traffic volume significantly increases. If the number of relay vehicles is reduced, communication reaches only a limited area.

In the second known art, although deletion of data prevents an increase in the bandwidth used for information transmission, the problem of the increase in the number of calls, in other words, the increase in the traffic volume, cannot be solved.

SUMMARY OF THE INVENTION

Accordingly, it is an object of the present invention to reduce the number of calls, in other words, the traffic volume, and to allow relaying of data in a wide area.

An inter-vehicle communication method according to the present invention performs communication by sequentially relaying transmission information among vehicles. For broadcasting the transmission information to peripheral vehicles, a relay vehicle is designated, and the relay vehicle broadcasts the transmission information to peripheral vehicles of the relay vehicle. Thus, the number of calls, in other words, the traffic volume, can be reduced. A vehicle transmitting or relaying the information may receive positional information from peripheral vehicles, identify a branch road on which each of the peripheral vehicles exists by referring to map information, and designate as the relay vehicle the peripheral vehicle farthest away from the vehicle transmitting or relaying the information on the branch road. Thus, the number of calls, in other words, the traffic volume, can be reduced, and data can be relayed in a wide area. Also, a jth relay vehicle performing jth relaying may add an ID of a transmission source vehicle and IDs of one or more (j+1)th relay vehicles to the transmission information. For broadcasting reception information, one of the (j+1)th relay vehicles may designate as a (j+2)th relay vehicle a peripheral vehicle that is farthest away from the (j+1)th relay vehicle on each branch road, that is not the jth relay vehicle and that is not any other (j+1) relay vehicle. Thus, the number of calls, in other words, the traffic volume, can be reduced, and data can be relayed in a wide area.

Also, a message ID unique to the transmission information may be added to the transmission information, a reception vehicle may determine whether or not the received information is previously received information on the basis of the message ID, the information may be disposed of when the information is previously received information, and the information may be presented to a driver when the information is not previously received information. Thus, redundant acquisition of data can be prevented.

Also, a vehicle transmitting or relaying the information may add data about the number of relays to the transmission information, the number of relays may be updated every time relaying is performed, and relaying may terminate when the number of relays becomes a set value. Thus, the information communication area can be restricted to a desired size.

BRIEF DESCRIPTION OF THE DRAWINGS

FIG. 5A shows a peripheral vehicle list;

FIG. 5B shows a reception information list;

FIG. 5C shows a present-vehicle information list;

FIG. 7 is a flowchart of a transmission process performed by a signal processing unit of the inter-vehicle communication device for transmitting information;

FIG. 8 is a flowchart of a process in which each vehicle regularly reports its own location to other vehicles;

FIG. 9 is a flowchart of a reception process performed by the signal processing unit of the inter-vehicle communication device for receiving information; and FIG. 10 is a flowchart of a relay process performed by the signal processing unit of a relay vehicle.

DESCRIPTION OF THE PREFERRED EMBODIMENTS

The present invention improves the communication load by designating a vehicle through which information hops (in other words, a vehicle relaying information) and broadcasting the information in a case where a plurality of vehicles exists in a communication area.

Figure 1:
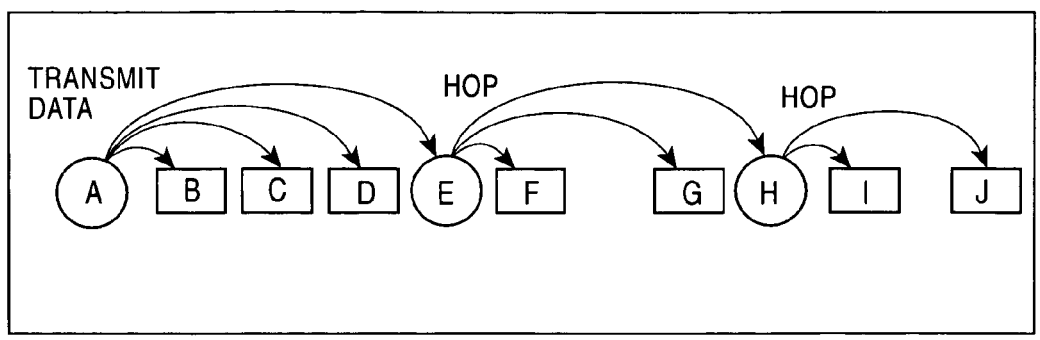
FIG. 1 is an explanatory diagram schematically showing the present invention.

FIG. 1 is an explanatory diagram schematically showing the present invention. When a vehicle A transmits transmission information, such as accident occurrence information, to its peripheral vehicles, the vehicle A designates a relay vehicle E and broadcasts the transmission information to peripheral vehicles B through E. Also, when the relay vehicle E transmits reception information to its peripheral vehicles, the relay vehicle E designates a relay vehicle H and broadcasts transmission information to vehicles F through H (the information hops). The relay vehicle H also relays information (the information hops).

Figure 2:
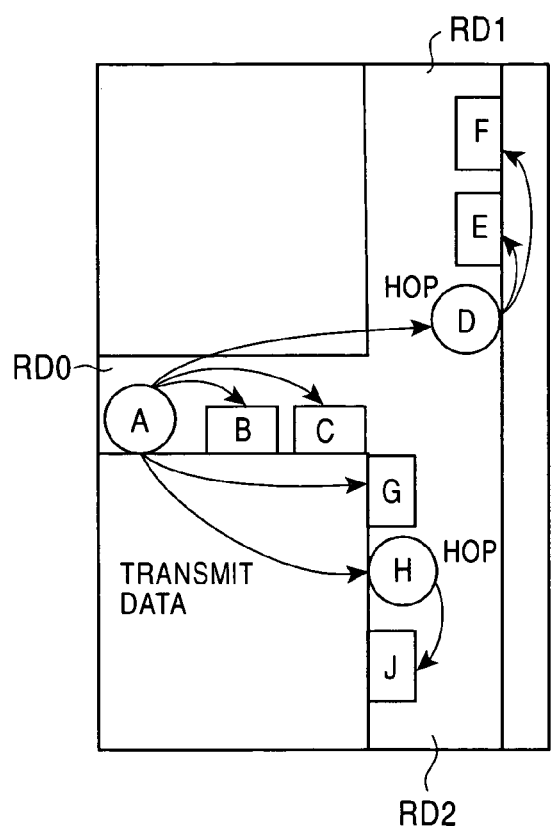
FIG. 2 is an explanatory diagram showing a method for determining a relay vehicle.
Figure 3C:
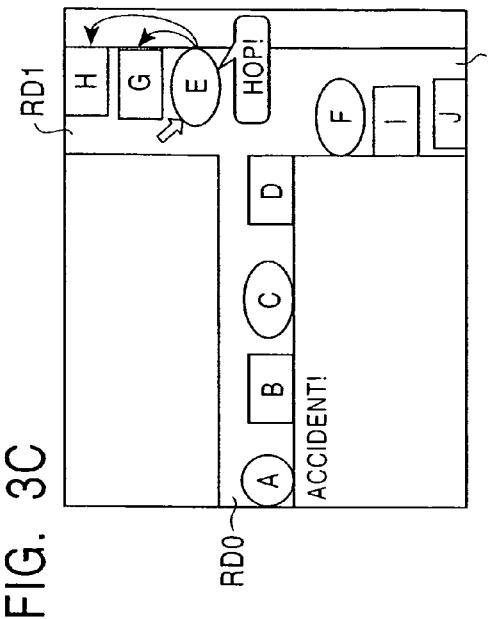
FIGS. 3A to 3D are illustrations for explaining the operation in more detail.
Figure 3D:
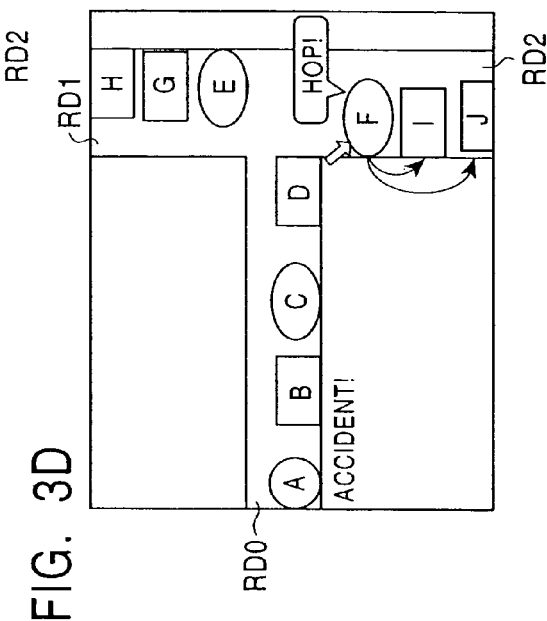
Figure 3A:
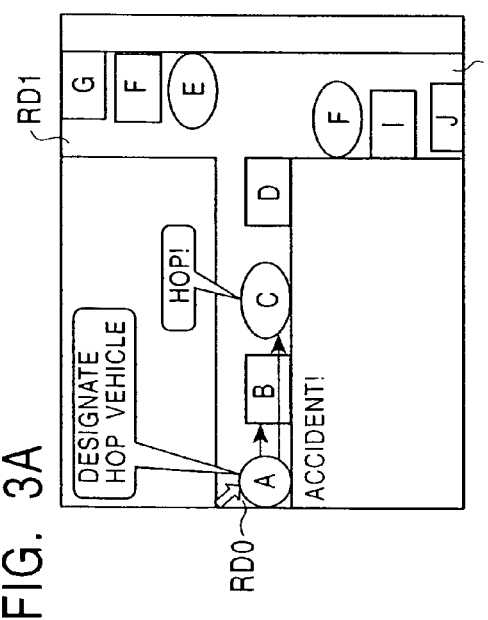
Figure 3B:
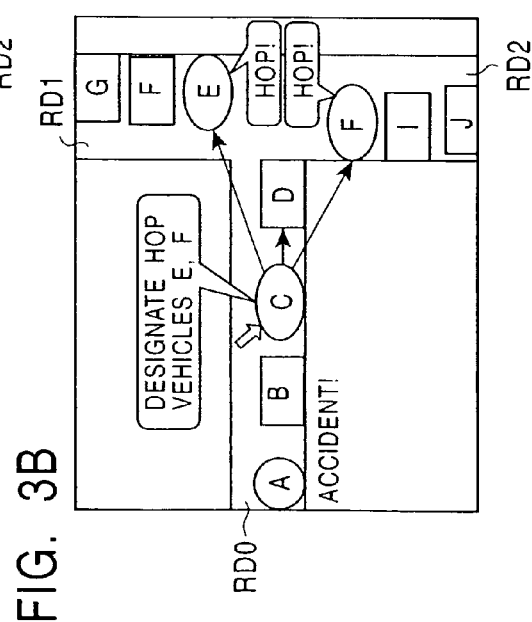

FIG. 2 is an explanatory diagram showing a method for determining a relay vehicle.

Each vehicle always understands the locations of its peripheral vehicles. In other words, each vehicle regularly transmits its own location together with a vehicle ID. Accordingly, vehicle A understands the locations of the peripheral vehicles B, C, D, G, and H that can communicate with vehicle A.

Each vehicle contains map data, and determines, as necessary, on which branch road (RD0, RD1, or RD2) each of the peripheral vehicles is located. Thus, vehicle A knows the branch road on which each of the peripheral vehicles B, C, D, G, and H that can communicate with vehicle A is located.

Accordingly, when transmission information, such as accident information, is generated, an inter-vehicle communication device of vehicle A performs the following processing:

(i) Vehicle A searches for the locations of its peripheral vehicles and determines whether or not other vehicles exist near vehicle A.

(ii) If a plurality of vehicles (vehicles B, C, D, G, and H) exist near vehicle A, vehicles D and H are determined to be farthest away from vehicle A on the branch roads RD1 and RD2, respectively, on the basis of the locations of the vehicles and map information.

(iii) Then, vehicles D and H determined by processing (ii) are set as vehicles through which the transmission information hops (in other words, vehicles that relay the transmission information), and vehicle A transmits (or broadcasts) the information to all the peripheral vehicles B, C, D, G, and H.

(iv) After receiving the information, the peripheral vehicles display the information, and at the same time, each of the peripheral vehicles determines whether or not that vehicle is set as a vehicle through which reception information should hop. If a peripheral vehicle is set as a vehicle through which the reception information should hop, the vehicle performs processing (ii) and (iii), so that the information hops again.

FIGS. 3A to 3D are illustrations explaining the operation in more detail. An example of communication when vehicle A transmits accident information is shown in FIGS. 3A to 3D.

(1) An accident occurs at vehicle A. (See FIG. 3A.)

(2) Vehicle A determines whether or not other vehicles exist near vehicle A on the basis of a report about location information sent from each of the peripheral vehicles.

(3) It is determined that vehicles B and C exist near vehicle A and on the same road as vehicle A.

(4) Vehicle A sets vehicle C, which is farthest away from vehicle A, as a vehicle that relays the accident information (in other words, the accident information hops through vehicle C), and transmits (or broadcasts) the accident information to all the peripheral vehicles.

(5) Vehicle B receives the information, and presents the information to the driver. Since vehicle B is not set as a hop vehicle, the processing ends.

(6) Vehicle C receives the information, and presents the information to the driver. Since vehicle C is set as a hop vehicle, reception information hops through vehicle C. (See FIG. 3B.)

(7) In other words, vehicle C determines whether or not other vehicles exist near vehicle C.

(8) Since it is determined that a plurality of vehicles (vehicles A, B, D, E, and F) exist near vehicle C, vehicle C determines the vehicle farthest away from vehicle C on each of the branch roads RD0, RD1, and RD2. Vehicles A, E, and F are selected as candidates for hop vehicles.

(9) Since vehicle A already transmitted the information to vehicle C, vehicle A is excluded from the farthest vehicles selected by processing (8). Then, vehicles E and F are set as hop vehicles.

(10) Vehicle C designates vehicles E and F so that the reception information hops through vehicles E and F. Vehicle C also transmits the accident information to all the peripheral vehicles.

(11) Since vehicles A and B already viewed the information (this is determined from a message ID), the information is disposed of.

(12) Vehicle D presents the information to the driver and ends the processing.

(13) Since vehicles E and F are designated as hop vehicles, after presenting the reception information to the drivers, the data hops through vehicles E and F to the subsequent peripheral vehicles. (See FIGS. 3C and 3D.)

(14) Hop vehicle E determines whether or not other vehicles exist near vehicle E.

(15) Since a plurality of vehicles (vehicles C, D, F, G, and H) exist near vehicle E, vehicle E determines the vehicle farthest away from vehicle E on each of the branch roads RD0, RD1, and RD2. The farthest vehicles C, H, and F are selected as candidates for hop vehicles.

(16) Hop vehicle C, which already transmitted the information to vehicle E, is excluded from the candidates. Thus, vehicles H and F are left as candidate hop vehicles.

(17) Also, it is determined whether or not any vehicle from among the candidate hop vehicles was already designated as a hop vehicle by hop vehicle C. Since vehicle F was designated as a hop vehicle for the branch road RD2 by hop vehicle C, vehicle F is excluded from the candidates. Accordingly, only vehicle H is set as the next hop vehicle.

(18) Vehicle E designates vehicle H as a hop vehicle, and transmits (or broadcasts) data to all the peripheral vehicles.

In parallel with processing (14) to (18) performed by vehicle E, vehicle F performs the following processing (14)' to (18)':

(14)' Hop vehicle F determines whether or not other vehicles exist near vehicle F.

(15)' Since a plurality of vehicles (vehicles C, D, E, I, and J) exist near vehicle F, vehicle F determines the vehicle farthest away from vehicle F on each of the branch roads RD0, RD1, and RD2. Vehicles C, E, and J are selected as candidates for hop vehicles.

(16)' Vehicle C, which already transmitted the information to vehicle F, is excluded from the candidates. Thus, vehicles I and J are left as candidate hop vehicles.

(17)' Also, it is determined whether or not any vehicle from among the candidate hop vehicles was already designated as a hop vehicle by hop vehicle C. Since vehicle E was designated as a hop vehicle for the branch road RD1 by hop vehicle C, vehicle E is excluded from the candidates. Accordingly, only vehicle J is set as the next hop vehicle.

(18)' Vehicle F designates vehicle J as a hop vehicle, and transmits (or broadcasts) data to all the peripheral vehicles.

Accordingly, inter-vehicle communication according to the present invention is performed based on processing (a) to (f):

(a) Each vehicle regularly broadcasts information about its own location in advance.

(b) A vehicle transmitting data designates a vehicle to relay the data.

(c) The transmission vehicle acquires information about the locations of its peripheral vehicles.

(d) For a straight road, the vehicle farthest away from the transmission vehicle is designated as a relay vehicle.

(e) If there is an intersection, the vehicle farthest away from the transmission vehicle on each branch road from the intersection is designated as a relay vehicle.

(f) If information previously received is received again, the information is disposed of.

The inter-vehicle communication described above can be used for the following types of information:

Accident Information

Distribution of accident information from a vehicle involved in an accident to its peripheral vehicles.

"Word-of-Mouth" Information (Response Information to a Transmission, Questions, or the Like)

Response information to a question, such as "What is the reputation of a destination landmark?"

Response information to a question, such as "Any recommended nearby spot?"

Warnings about Emergency Vehicles

Information transmitted by an emergency terminal (inter-vehicle communication device) such as an ambulance, a police car, or the like. Transmission of such information draws the attention of the drivers of peripheral vehicles to the approach of an emergency vehicle and enables smooth passage.

Other Broadcast Distribution Information

Figure 4:
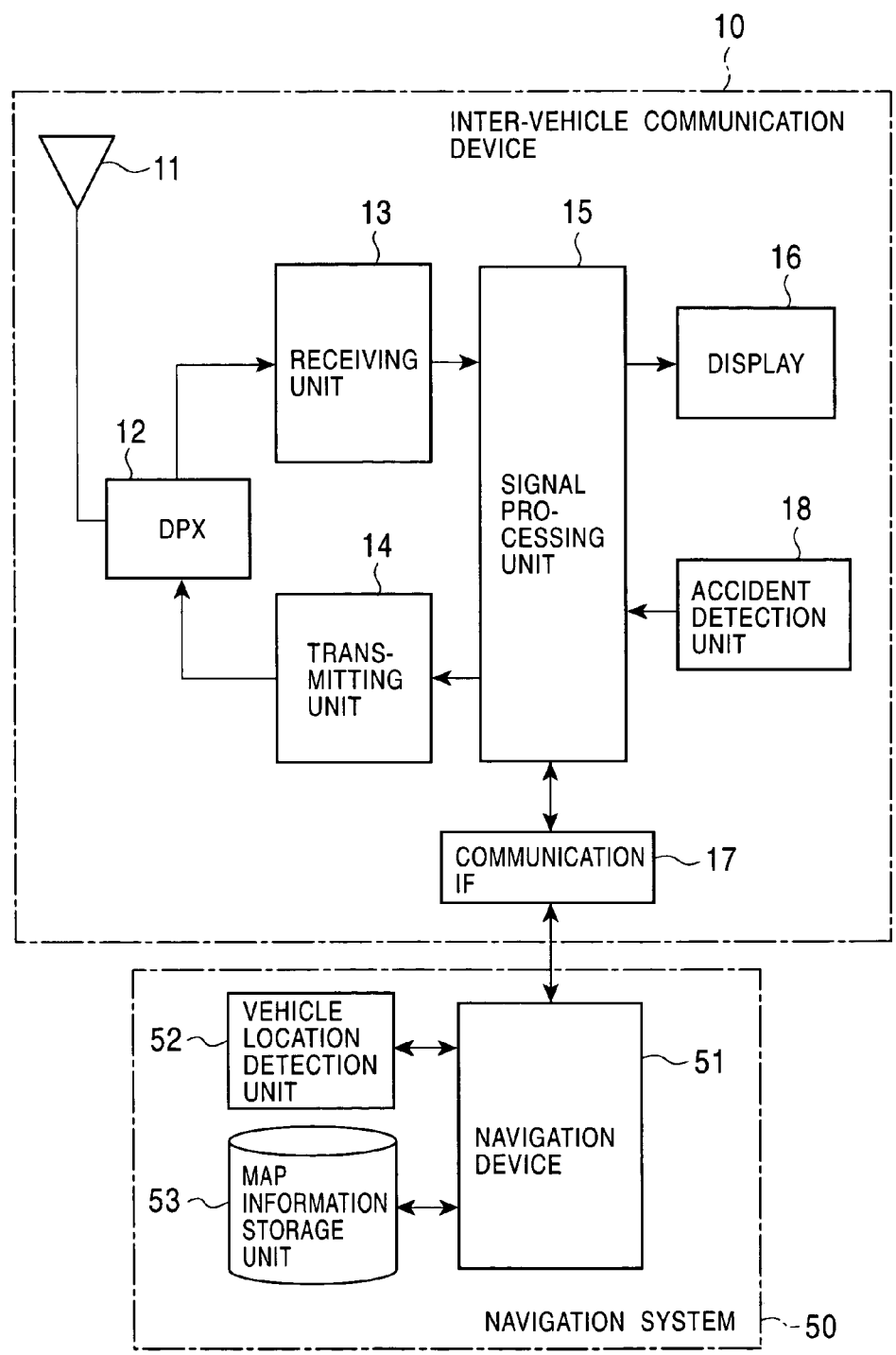
FIG. 4 shows the structure of an inter-vehicle communication device according to the present invention.

FIG. 4 shows the structure of an inter-vehicle communication device 10 according to the present invention. The inter-vehicle communication device 10 is connected to a navigation system 50 and is capable of communicating with the navigation system 50. The inter-vehicle communication device 10 includes a receiving unit 13 and a transmitting unit 14 for receiving and transmitting information from and to other inter-vehicle communication devices using an antenna 11 and a duplexer 12, a signal processing unit 15 for performing signal processing for inter-vehicle communication, a display 16 for presenting reception information to a driver, a communication interface 17 for controlling communication with the navigation system 50, and an accident detection unit 18.

The signal processing unit 15 contains a memory and stores a peripheral vehicle list 21, a reception information list 22, and a present-vehicle information list 23, as shown in FIGS. 5A to 5C, respectively. The peripheral vehicle list 21 includes peripheral vehicle IDs and positional information (longitude and latitude) that are regularly received from peripheral vehicles, roads (or branch roads) on which peripheral vehicles exist, which are acquired by internal processing, and relay flag information indicating relay vehicles. The reception information list 22 includes a transmission vehicle ID, the number of a message, the number (H) of relays, relay vehicle IDs, and information (or a reception message) that is acquired from transmission information. The present-vehicle information list 23 includes the current vehicle's ID and location and other information. The inter-vehicle communication device 10 shown in FIG. 4 is merely an example, and a Bluetooth (trademark) device or a wireless local area network (LAN) terminal device may be used.

The navigation system 50 includes a navigation device 51, a present-vehicle location detection unit 52, such as a global positioning system (GPS), for detecting the location of the vehicle, and a map information storage unit 53 for storing map information. The navigation device 51 performs well-known navigation control. The navigation device 51 also performs various types of processing, such as identifying a road on which a peripheral vehicle exists and determining the farthest vehicle, in accordance with a query from the inter-vehicle communication device 10. The signal processing unit 15 may have these functions.

Figure 6:
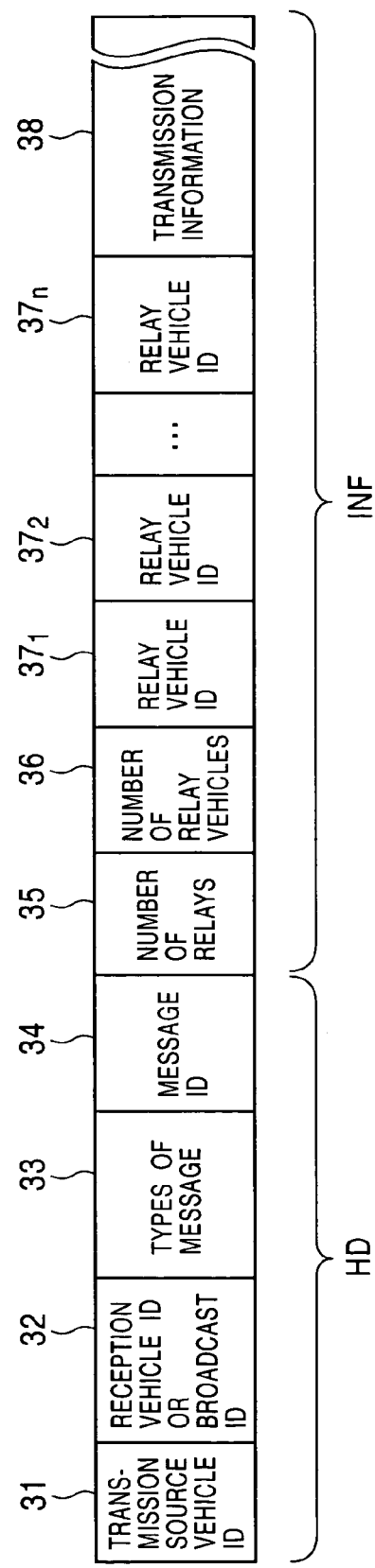
FIG. 6 shows a format of inter-vehicle communication information.

FIG. 6 shows a format of inter-vehicle communication information. The inter-vehicle communication information includes a header HD and an information part INF. The header HD contains a transmission source vehicle ID 31, a reception vehicle ID or a broadcast ID 32, message type information (information about the type, such as positional information, inter-vehicle communication information, or the like) 33, and a message ID 34. The information part INF contains the number H of relays 35, the number of relay vehicles 36, IDs of relay vehicles 371 to 37n, and transmission information 38.

FIG. 7 is a flowchart of a transmission process performed by the signal processing unit 15 of the inter-vehicle communication device 10 for transmitting information. The signal processing unit 15 determines whether or not there is any information to be transmitted to other inter-vehicle communication devices (step S101). Such information may be accident information, response information to a question, a warning about an emergency vehicle, or the like.

If there is information to be transmitted, the signal processing unit 15 determines whether or not there is any peripheral vehicle by referring to the peripheral vehicle list 21 (see FIG. 5A) (step S102). If there is a peripheral vehicle, the signal processing unit 15 acquires a branch road on which each peripheral vehicle exists by querying the navigation system 50 (step S103). Alternatively, the signal processing unit 15 may identify, by itself, a road on which each peripheral vehicle exists by referring to map information.

Then, the signal processing unit 15 determines the farthest vehicle on each branch road and sets the farthest vehicle as a hop vehicle (step S104). In other words, for a straight road, the farthest vehicle is designated as a relay vehicle. If there is an intersection, the farthest vehicle on each branch road (a straight road is also referred to as a branch road) from the intersection is designated as a relay vehicle. Then, the signal processing unit 15 creates a message (see FIG. 6) to be transmitted to each peripheral vehicle (step S105) and broadcasts the message (step S106).

FIG. 8 is a flowchart of a process in which each vehicle regularly reports its own location to other vehicles.

When the signal processing unit 15 of each vehicle starts, the signal processing unit 15 acquires its own location from the navigation system 50 and broadcasts it (step S201). The signal processing unit 15 determines whether or not the vehicle has traveled a predetermined distance (step S202). If the vehicle has not traveled the predetermined distance, the signal processing unit 15 determines whether or not positional information is received from other vehicles (step S203). If the signal processing unit 15 does not receive the positional information, the signal processing unit 15 returns to step S202. If the signal processing unit 15 receives the positional information from other vehicles, the signal processing unit 15 updates the peripheral vehicle list 21 shown in FIG. 5A (step S204) and returns to step S202. If the signal processing unit 15 determines that the vehicle has traveled the predetermined distance in step S202, the signal processing unit 15 returns to step S201 to broadcast its own location. Then, the signal processing unit 15 proceeds to the subsequent processing. Accordingly, the signal processing unit 15 of each vehicle is capable of managing the location of its peripheral vehicles.

Although the signal processing unit 15 regularly broadcasts information about its own location after traveling a predetermined distance in the example described above, the signal processing unit 15 may regularly broadcast information about its own location after the lapse of a predetermined time.

FIG. 9 is a flowchart of a reception process performed by the signal processing unit 15 of the inter-vehicle communication device 10 for receiving information. The signal processing unit 15 determines whether or not the signal processing unit 15 receives inter-vehicle communication information from other vehicles (step S301). If the signal processing unit 15 receives the inter-vehicle communication information from other vehicles, the signal processing unit 15 determines whether or not the information is a previously received message by referring to a message ID included in the reception information (step S302). If the information is previously received information, the signal processing unit 15 disposes of the information (step S303) and waits to receive the next inter-vehicle communication information.

If the information is not previously received information, the signal processing unit 15 acquires the message and displays the message on the display 16 to present it to the driver (step S304). Then, the signal processing unit 15 determines whether or not that vehicle is designated as a relay vehicle (hop vehicle) by referring to a relay vehicle ID included in the reception information (step S305). If that vehicle is not designated as a relay vehicle, the signal processing unit 15 waits to receive the next inter-vehicle communication information.

In contrast, if that vehicle is designated as a relay vehicle, the signal processing unit 15 determines whether or not the number H of relays (the initial value is 0) is a set value (step S306). If the number H of relays is the set value, the signal processing unit 15 waits to receive the next inter-vehicle communication information. If the number H of relays is not the set value, the number of relays is updated on the basis of the expression H+1→H (step S307). Then, the signal processing unit 15 performs relay processing shown in FIG. 10, and transmits reception information to the subsequent peripheral vehicles (step S308). Alternatively, the number of relays may be set as an initial value of H. In this case, the signal processing unit 15 determines whether or not H is 0. If H is 0, the signal processing unit 15 waits to receive the next inter-vehicle communication information. If H is 1 or more, the number of relays is updated on the basis of the expression H−1→H. Then, the signal processing unit 15 performs relay processing, and transmits reception information to the subsequent peripheral vehicles.

In the relay processing shown in FIG. 10, the signal processing unit 15 of the relay vehicle determines whether or not any peripheral vehicle exists by referring to the peripheral vehicle list 21 shown in FIG. 5A (step S401). If there is no peripheral vehicle, the relay processing ends. If there is a peripheral vehicle, the signal processing unit 15 acquires a branch road on which each peripheral vehicle exists by querying the navigation system 50 (step S402).

Then, the signal processing unit 15 determines the farthest vehicle on each branch road, and sets the farthest vehicle as a hop vehicle (step S403). In other words, for a straight road, the farthest vehicle is designated as a candidate for a hop vehicle. If there is an intersection, the farthest vehicle on each branch road (a straight road is also referred to as a branch road) from the intersection is designated as a candidate for a hop vehicle.

Then, the signal processing unit 15 refers to the transmission source vehicle ID included in the reception information, and determines whether or not the vehicle transmitting the information is included in the candidate hop vehicles. If the vehicle transmitting the information is included in the candidates, the vehicle is excluded from the candidates (see processing (16) and (16)' described above). Also, the signal processing unit 15 refers to IDs of other relay vehicles included in the reception information, and determines whether or not the vehicle designated as a hop vehicle by another vehicle is included in the candidate hop vehicles. If the vehicle designated by the other vehicle is included in the candidates, the designated vehicle is excluded from the candidates (see processing (17) and (17)' describe above) (step S404).

Then, the signal processing unit 15 creates the transmission information shown in FIG. 6 (step S405), and broadcasts the information to the peripheral vehicles (step S406).

What is claimed is:

1. An inter-vehicle communication method for performing communication by sequentially relaying predetermined information among vehicles, the method comprising:
    broadcasting the predetermined information from a first vehicle to peripheral vehicles of the first vehicle;
    designating a relay vehicle from among the peripheral vehicles of the first vehicle; and
    broadcasting, by the relay vehicle, the predetermined information to peripheral vehicles of the relay vehicle.

2. An inter-vehicle communication method according to claim 1, further comprising:
    receiving positional information from the peripheral vehicles of the first vehicle;
    identifying a branch road on which each of the peripheral vehicles of the first vehicle exists by referring to map information; and
    designating the peripheral vehicle of the first vehicle farthest away from the first vehicle on the branch road as the relay vehicle.

3. An inter-vehicle communication method according to claim 2, further comprising:
    adding, by a vehicle transmitting or relaying the predetermined information, a message ID unique to the predetermined information;
    determining, by a reception vehicle, whether or not the predetermined information has been received previously on the basis of the message ID;
    disposing of, by the reception vehicle, the predetermined information when the information has been received previously; and
    presenting, by the reception vehicle, the predetermined information when the predetermined information has not been previously received.

4. An inter-vehicle communication method according to claim 2, further comprising:

adding, by a jth relay vehicle performing jth relaying, an ID of a transmission source vehicle and IDs of one or more (j+1)th relay vehicles to the predetermined information; and designating, by one of the (j+1)th relay vehicles, a peripheral vehicle that is farthest away from the (j+1)th relay vehicle on each branch road, that is not the jth relay vehicle and that is not any other (j+1)th relay vehicle, as a (j+2)th relay vehicle when the (j+1)th relay vehicle broadcasts the predetermined information.

5. An inter-vehicle communication method according to claim 2, further comprising:

adding, by a vehicle transmitting or relaying the predetermined information, data about the number of relays associated with the predetermined information;

updating the number of relays every time relaying is performed; and terminating relaying when the number of relays becomes a set value.

6. An inter-vehicle communication method according to claim 1, further comprising the act of adding a vehicle ID of the broadcasting vehicle when the predetermined information is broadcast to peripheral vehicles.

7. An on-vehicle inter-vehicle communication device for performing communication by sequentially relaying predetermined information among vehicles, the device comprising:

a transmitting unit for transmitting the predetermined information from the vehicle to other vehicles through inter-vehicle communication;

a receiving unit for receiving the predetermined information transmitted from other vehicles through inter-vehicle communication;

a signal processing unit for designating a relay vehicle, broadcasting the predetermined information to peripheral vehicles of the vehicle, determining whether or not the vehicle is designated as a relay vehicle when the predetermined information is received from other vehicles, and designating the next relay vehicle and broadcasting received predetermined information to peripheral vehicles of the vehicle when said vehicle is designated as a relay vehicle;

a communication unit for transferring information to and from a navigation device; and a display unit for receiving the predetermined information and displaying information.

8. An inter-vehicle communication device according to claim 7, wherein the predetermined information includes at least positional information of a vehicle and relay flag information indicating a relay vehicle.

9. An inter-vehicle communication device according to claim 7, wherein the signal processing unit receives positional information from peripheral vehicles of the vehicle in advance, identifies a branch road on which each of the peripheral vehicles exists by referring to map information, and designates the peripheral vehicle farthest away from the vehicle on the branch road as a relay vehicle.

10. An inter-vehicle communication device according to claim 7, wherein the signal processing unit regularly broadcasts positional information of the vehicle and a vehicle ID as the predetermined information.

11. An inter-vehicle communication device according to claim 7, wherein the signal processing unit requests the navigation device to determine the peripheral vehicle farthest away from said vehicle on each branch road and designates the farthest peripheral vehicle on each branch road as the relay vehicle.

12. An inter-vehicle communication device according to claim 7, wherein the signal processing unit adds a message ID unique to the predetermined information, determines whether or not the predetermined information has been previously received on the basis of the message ID, disposes of the predetermined information it has been previously received, and is capable of presenting information to a driver when the predetermined information has not been previously received.

13. An inter-vehicle communication device according to claim 7, wherein, for broadcasting the predetermined information, the signal processing unit of a jth relay vehicle performing jth relaying adds an ID of a transmission source vehicle and IDs of one or more (j+1)th relay vehicles to the predetermined information, and wherein, for broadcasting the predetermined information, the signal processing unit of one of the (j+1)th relay vehicles designates as a (j+2)th relay vehicle a peripheral vehicle that is farthest away from the (j+1)th relay vehicle on each branch road, that is not the jth relay vehicle and that is not any other (j+1)th relay vehicle.

14. An inter-vehicle communication device according to claim 7, wherein the signal processing unit adds data about the number of relays permitted for the predetermined information, updates the number of relays every time relaying is performed, and terminates relaying when the number of relays becomes a set value.

15. An on-vehicle inter-vehicle communication device for performing communication by sequentially relaying predetermined information among vehicles, the device comprising:

a transmitting unit for transmitting the predetermined information from the vehicle to other vehicles through inter-vehicle communication;

a receiving unit for receiving the predetermined information transmitted from other vehicles through inter-vehicle communication; and a signal processing unit for designating a relay vehicle, broadcasting the predetermined information to peripheral vehicles of the vehicle, determining whether or not the vehicle is designated as a relay vehicle when the predetermined information is received from other vehicles, and designating the next relay vehicle and broadcasting received predetermined information to peripheral vehicles of the vehicle when said vehicle is designated as the relay vehicle, wherein for broadcasting the predetermined information, the signal processing unit of a jth relay vehicle performing jth relaying adds an ID of a transmission source vehicle and IDs of one or more (j+1)th relay vehicles to the predetermined information, and wherein, for broadcasting the predetermined information, one of the (j+1)th relay vehicles designates as a (j+2)th relay vehicle a peripheral vehicle that is farthest away from the (j+1)th relay vehicle on each branch road, that is not the jth relay vehicle and that is not any other (j+1)th relay vehicle.

16. An inter-vehicle communication device according to claim 15, further comprising:

a communication unit for transferring information to and from a navigation device; and a display unit for receiving the predetermined information and displaying information.

17. An inter-vehicle communication device according to claim 16, wherein the signal processing unit requests the navigation device to determine the peripheral vehicle farthest away from said vehicle on each branch road and designates the farthest peripheral vehicle on each branch road as the relay vehicle.

18. An inter-vehicle communication device according to claim 17, wherein the signal processing unit adds a message ID unique to the predetermined information, determines whether or not the information has been previously received on the basis of the message ID, disposes of the predetermined information when it has been previously received, and is capable of presenting information to a driver when the predetermined information has not been previously received.

19. An inter-vehicle communication device according to claim 18, wherein the signal processing unit adds data about the number of relays permitted for the predetermined information, updates the number of relays every time relaying is performed, and terminates relaying when the number of relays becomes a set value.

20. An inter-vehicle communication device according to claim 19, wherein the signal processing unit regularly broadcasts positional information of the vehicle and a vehicle ID as the predetermined information.

* * * * *